US005522431A

United States Patent [19]
Bonacorsi et al.

[11] Patent Number: 5,522,431
[45] Date of Patent: Jun. 4, 1996

[54] SOLENOID VALVE CONTROL SYSTEM

[75] Inventors: Dennis L. Bonacorsi, Howell; Charles W. Chill, White Lake, both of Mich.; William S. Smith, Scottsdale, Ariz.; Jeffrey H. Welker, Highland, Mich.

[73] Assignee: Numatics, Inc., Highland, Mich.

[21] Appl. No.: 402,004

[22] Filed: Mar. 10, 1995

[51] Int. Cl.⁶ .................................................. F16K 31/02
[52] U.S. Cl. ...................................... 137/884; 137/596.16
[58] Field of Search .......................... 137/596.16, 596.17, 137/596.18, 884

[56] References Cited

U.S. PATENT DOCUMENTS

| | | | |
|---|---|---|---|
| 4,399,836 | 8/1983 | de Versterre et al. | 137/884 X |
| 4,928,730 | 5/1990 | Ando et al. | 137/884 X |
| 5,301,717 | 4/1994 | Goedecke | 137/884 |

*Primary Examiner*—John C. Fox
*Attorney, Agent, or Firm*—Barnes, Kisselle, Raisch, Choate, Whittemore & Hulbert

[57] ABSTRACT

A plurality of solenoid control valves each mounted on a module of a manifold with a terminal block for each valve removably received in the manifold and having at least three terminals. A printed circuit board with a microprocessor and a coil driver mounted on the board has three spaced apart electric connectors releasably secured to separate terminals of the same terminal block and each having a shank received in a hole through the circuit board and electrically connected to a printed circuit on the board by solder to both mount and support the circuit board on the terminal block and provide output of the coil driver to the coils of two solenoids for controlling the application of electric power to them. An auxiliary circuit board with another coil driver and electric connectors mounted on another terminal block is daisy chained with the microprocessor for controlling the application of electric power to additional solenoid coils. Additional solenoid coils may also be connected to the outputs of the coil drivers for controlling through the microprocessor the application of electric power to them.

44 Claims, 4 Drawing Sheets 5,522,431

SOLENOID VALVE CONTROL SYSTEM

FIELD OF THE INVENTION

This invention relates to solenoid actuated fluid control valves and more particularly to an electronic system for actuating and controlling solenoid valves.

BACKGROUND OF THE INVENTION

Valves for controlling the flow of hydraulic and pneumatic fluid which are actuated by one or two electric solenoids are known and have been used in automated manufacturing equipment, production lines and numerous industrial applications for many years. Frequently, a plurality of these solenoid actuated valves are mounted on a manifold having a plurality of passages for supplying fluid to the valves and providing connecting passages for connecting fluid couplings to various outlet ports of each valve. For many years, each solenoid of each valve was separately electrically wired into an electrical or electronic system for supplying power to and controlling the cycling of each solenoid as required for each application in which the valves were used.

More recently, programmable logic controllers and suitably programmed digital computers have been utilized to cycle and control solenoid actuated valves in many automated machinery, equipment, and production line applications. Typically, the controller or computer actuates an electronic switching device or even a relay which is in a location remote from the solenoid valve and hence requires many long runs of power feed wires between the switching device and each solenoid of each valve. Thus, there is a need for a system which greatly reduces the time, effort, expense, complexity and quantity of wire required to power and operably connect a plurality of solenoid actuated valves with a programmable controller or a digital computer for cycling and controlling solenoid valves in various automated machinery, equipment production lines and other industrial applications.

SUMMARY OF THE INVENTION

A serial communication system for cycling and controlling a plurality of solenoid actuated valves with a programmable logic controller or a digital computer. Each of a plurality of solenoid valves is removably mounted on a module of a manifold which has a terminal block for electrical connection with the solenoids of each valve. A circuit board is removably mounted on one terminal block by three electrical connectors and has both a coil driver and a microprocessor communicating on a bus network with the programmable controller or computer to control the coil driver for applying electric power to each of a pluralilty of solenoid coils of the valves. The three electrical connectors are each releasably securable to separate terminals of the same terminal block and have a shank received in a hole through the board and electrically connected to a portion of its printed circuit to both mount the board and supply power to two solenoid coils. If required to control all of the valves on a manifold, one or more additional circuit boards containing additional coil drivers can be removably mounted on other terminal blocks of the manifold and daisy chained with the microprocessor. This permits a single microprocessor utilizing a single address to cycle and control a large number of solenoid valves. Preferably, to facilitate installation and replacement, each circuit board has plug-in connectors and each manifold has separate quick connectors for solenoid power and bus line communications.

Objects, features and advantages of this invention include a solenoid valve communication control system which greatly decreases the quantity of wire and number of wires required, is compact and contained in the manifold, has circuit cards which are easily installed and removed, permits additional solenoid valves and coil driver circuit cards to be added as needed, requires far fewer addresses on a bus system, can be easily installed in the field on existing solenoid valves with manifolds not having an electronic control system, can use the same communication circuit card with different communication protocols, can use the same auxiliary coil driver circuit card regardless of the communication protocal required, substantially decreases assembly, wiring and installation, time, effort and expense, and is rugged, durable, reliable, easily replaceable, and of relatively simple design and economical manufacture, assembly and installation.

BRIEF DESCRIPTION OF THE DRAWINGS

These and other objects, features and advantages of this invention will be apparent from the following detailed description, appended claims and accompanying drawings in which:

DETAILED DESCRIPTION

Figure 1:
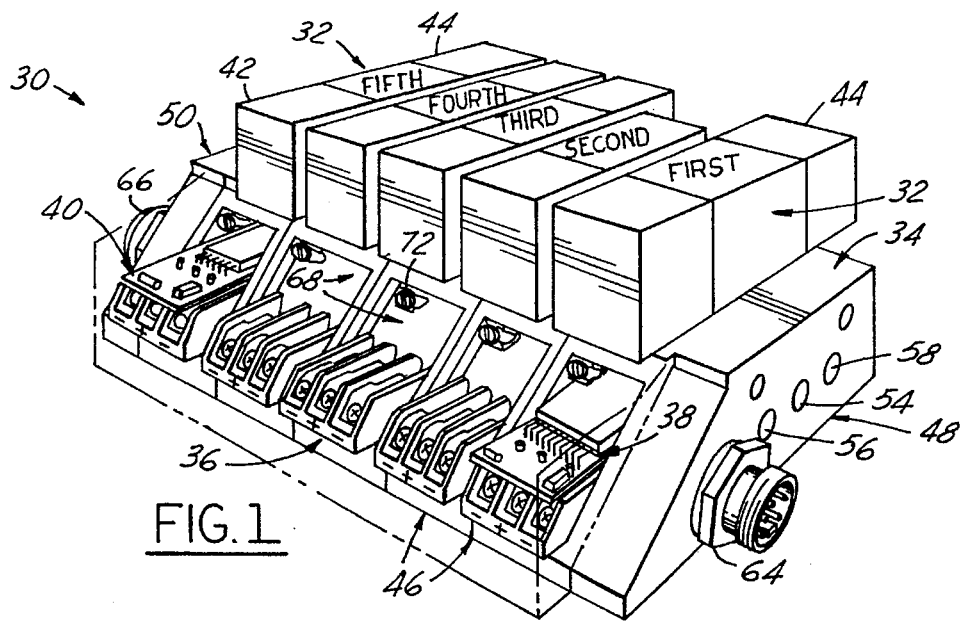
FIG. 1 is a perspective view of a plurality of solenoid actuated control valves mounted on a modular manifold and embodying the electronic communication control system of this invention.
Figure 2:
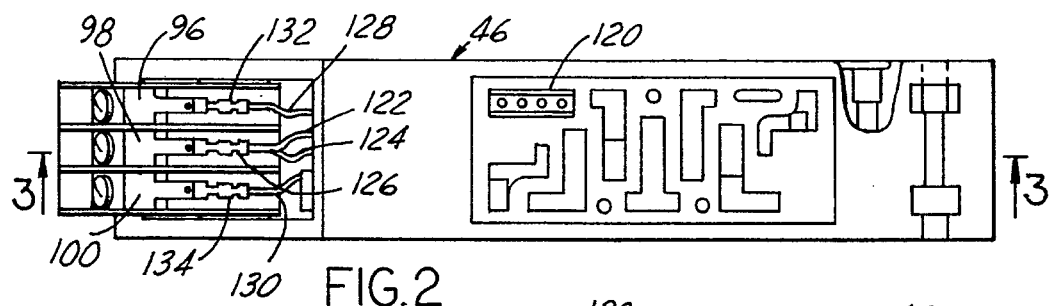
FIG. 2 is a top view of one module of the manifold.

FIG. 1 illustrates a pneumatic solenoid control valve and manifold assembly 30 embodying this invention which has a pluralilty of solenoid control valves 32 each received on a manifold 34 with a terminal block 36 for each valve. A communication card 38 is removably mounted on one of the terminal blocks for communicating through a bus network with a programmable logic controller or programmed digital computer to sequence, cycle and control the solenoid valves. An auxiliary coil driver card 40 is removably mounted on another terminal block and connected in a daisy chain fashion with a microprocessor of the communication card 38 to provide an additional driver to energize and control some of the solenoids of the valves. Typically, the control valves 32 are pneumatic or hydraulic three or four-way two or three position valves which are usually actuated by two electric solenoids 42 and 44 although in some applications a two position valve may have only one electric actuator solenoid. Sometimes two-way valves with only one actuator electric solenoid are also used.

The manifold 34 is of modular construction and has a plurality of the same modules 46 disposed in side by side relation between a pair of end plates 48 and 50. Typically, for a pneumatic system, the manifold has a common pressure supply passage 54 and two separate common exhaust passages 56 & 58 which communicate with all of the solenoid valves. Each module 46 has an individual outlet port 60 and a return port 60 which communicates with only the solenoid valve 32 received on the module. The arrangement of fluid ports and passages in the manifold and in each module may be of conventional construction well known in the art and hence will not be described in further detail. A quick connect electrical connector 64 for the communication circuit board 38 is mounted on one end plate 48 and a quick connect electrical connector 66 for supplying electric power for operating the solenoids of the valves is mounted on the other end plate 50.

Figure 3:
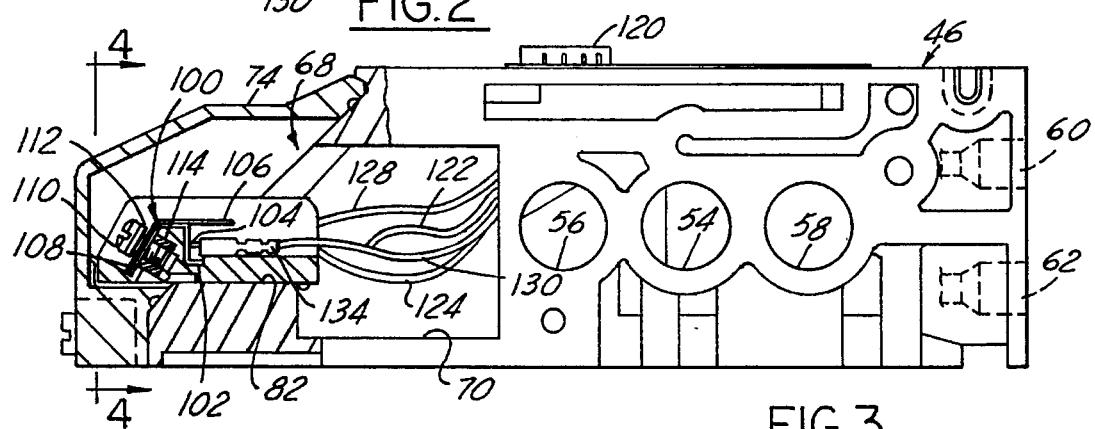
FIG. 3 is a side view partially in section of the manifold module.
Figure 4:
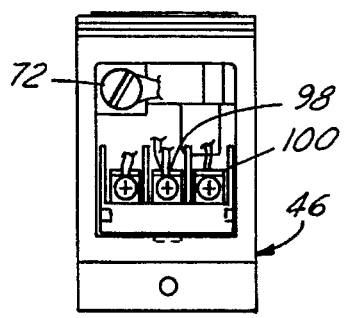
FIG. 4 is an end view taken on line 4—4 of FIG. 3 with the cover removed of the manifold module.
Figure 5:
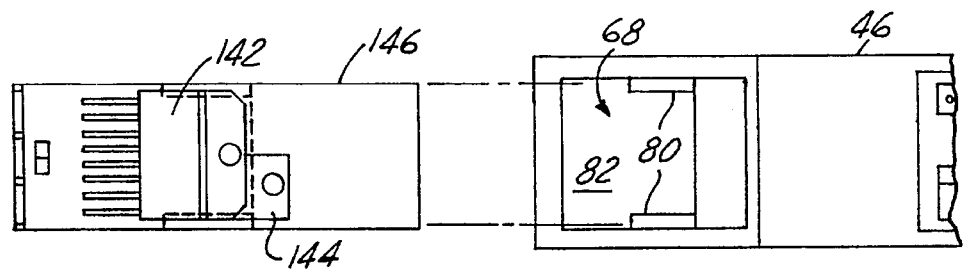
FIG. 5 is a fragmentary exploded top view of a manifold module with a communication circuit card on its terminal block.
Figure 6:
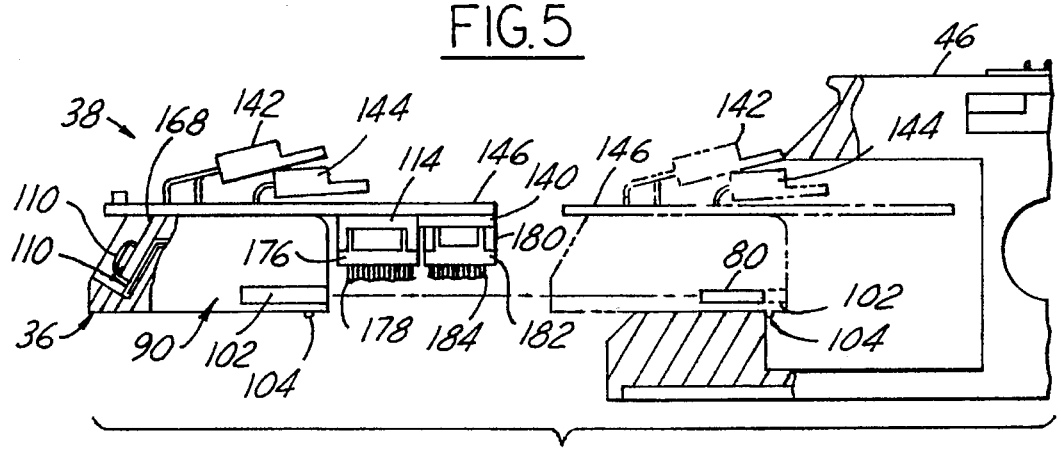
FIG. 6 is a fragmentary and exploded side view of the module of FIG. 5 and its terminal block and communication circuit card.
Figure 7:
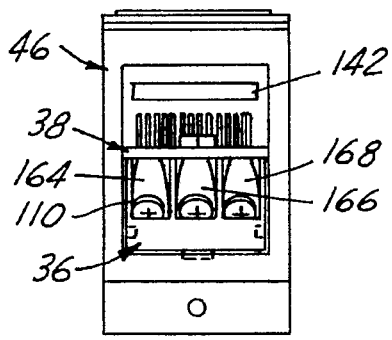
FIG. 7 is an end view of the terminal block and communication circuit card received in the manifold.

Each manifold module 46 has a slot 68 slidably receiving a terminal block 36, and an adjoining through opening 70 for housing electric wires and any circuit card, a grounding screw and post 72, and a removable cover 74 preferably of an electrically insulating plastic material releasably secured to the front of the module by a threaded screw 76. As shown in FIGS. 3, 5 & 6, the terminal block 36 is removably receivable in the slot 68, is guided into and out of the slot by a pair of parallel rails 80 and in assembly rests on the base 82 of the slot.

Figure 8:
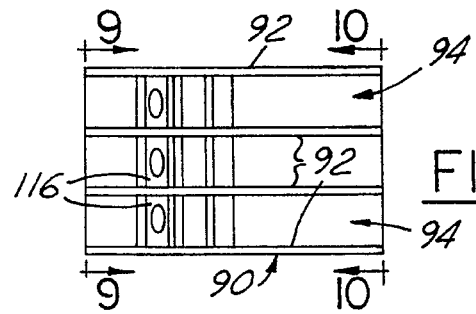
FIG. 8 is a top view of a terminal block.
Figure 9:
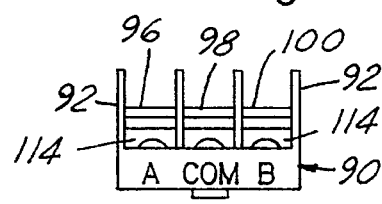
FIG. 9 is a front view of the terminal block.
Figure 10:
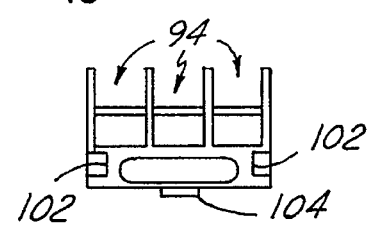
FIG. 10 is a rear view of the terminal block.
Figure 11:
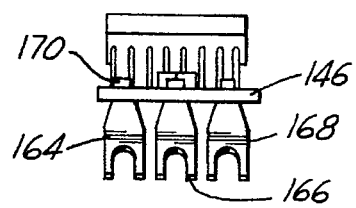
FIG. 11 is a front view of the communication circuit card.
Figure 12:
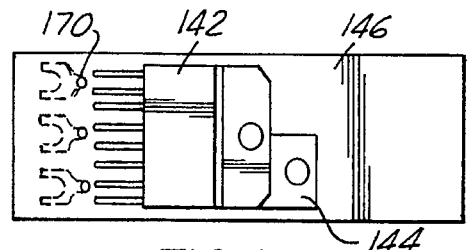
FIG. 12 is a top view of the communication circuit card.

As shown in FIGS. 8–10, the terminal block 36 has a base housing 90 with upstanding walls 92, defining slots 94 in which terminal clips 96, 98, 100, all of the same construction, are received. For slidably receiving the guide rails 80, the base has a pair of opposed parallel grooves 102 in its sides and for releasably retaining the terminal block in the slot a detent 104 on its bottom adjacent its back end.

As shown in FIG. 3, each terminal clip is a bent piece of electrically conductive metal having a retainer tab 102, a pair of spaced posts 104 and 106 for push on electrical connectors, and a connector tab 108 with a through hole for receiving a screw 110 for securing a spade connector or an electric wire in firm engagement with the connector tab 108. A washer 112 is received on the screw 110 which is threaded into a nut 114 received in a pocket 116 in the base which, in cooperation with the tab 102, retains the terminal clip in the base housing. To prevent rotation of the nut, it has a non-circular and preferably square perimeter and the pocket has a complementary configuration.

In assembly, in each module 46 the terminal block 36 is electrically connected with the electric coils of it solenoids 42 and 44 through a male plug 118 in the valve assembly 32 and a complementary female plug receptable 120 secured to the top of the module and suitable electric lead wires. The solenoid coils are typically energized with 24 volt direct current and may be connected with the terminal block in either a sourceing or a sinking mode as is well known in the art. If connected in the sinking mode, the positive lead wires for the coils of both solenoids 42 and 44 are connected to the center terminal 98 by lead wires 122 & 124 with a push-on terminal 126 received on its terminal post 104. The negative lead wires 128 and 130 of the coils of these respective solenoids 42 and 44 are connected by suitable push-on connectors 132 & 134 of the terminal clips 96 and 100 respectively.

Figure 13:
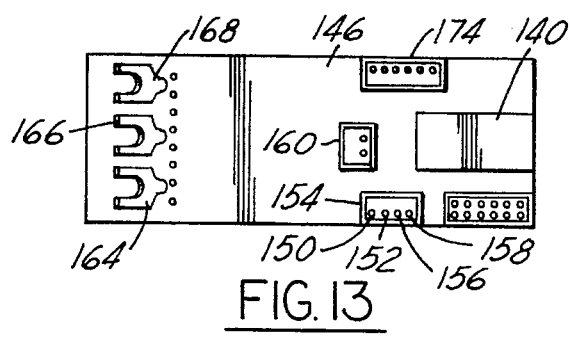
FIG. 13 is a bottom view of the communication circuit card.
Figure 14:
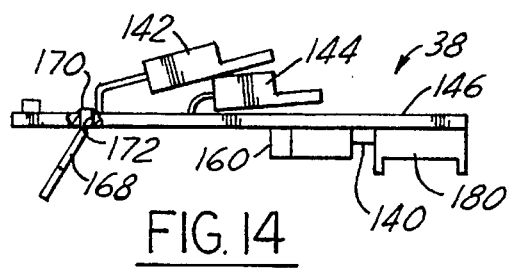
FIG. 14 is a side view of the communication circuit card.
Figure 15:
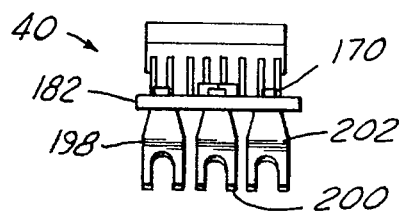
FIG. 15 is a front view of an auxiliary coil driver circuit card.
Figure 16:
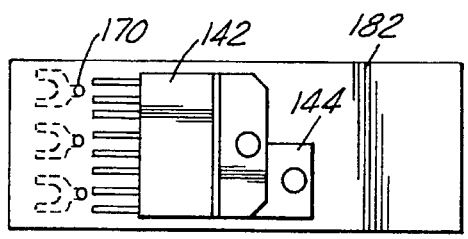
FIG. 16 is a top view of the auxiliary coil driver circuit card.
Figure 17:
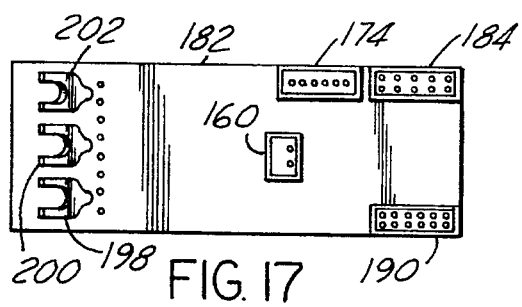
FIG. 17 is a bottom view of the auxiliary coil driver circuit card.
Figure 18:
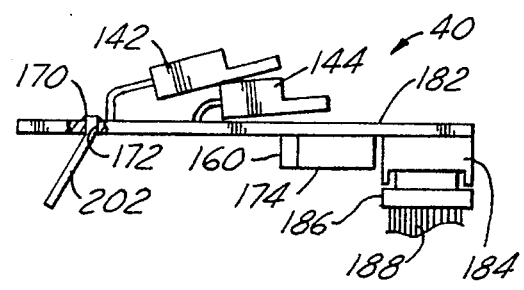
FIG. 18 is a side view of the auxiiliary coil driver circuit card.

As shown in FIG. 6 communication card 38 has a communication microprocessor or chip 140, a coil driver 142, and a voltage regulator 144 mounted on a circuit board 146 with a suitable printed circuit thereon. The microprocessor 140 communicates through a bus network with a programmable logic controller or a suitably programmed digital computer to control the outputs of the coil driver to cycle and actuate the solenoids 42 and 44 of the control valves 32. The microprocessor 140 communicates with the bus network of the controller or computer through pins 150 and 152 of a plug connector 154 (FIG. 13) mounted on the bottom of the circuit board and electric power is supplied to the micro processor through two other pins 156 and 158 of this connector. The voltage regulator 144 supplies power to the other components of the circuit board 146 including the actuating power for switching or changing the state of the outputs of the coil driver 142. Preferably power at 24 volts of direct current is supplied to the input of voltage regulator 144 (which has an output of 5 volts) through the pins of a plug 160 mounted on the bottom of the circuit board.

Typically, the coil driver 142 can actuate and control or change the state of up to eight individual solenoid coils. The output of the driver 142 for the first two solenoid coils (47 of the first valve 32) is supplied to three spade terminals 164, 166, 168 each having a shank 170 received in a hole 172 through the board 146 and electrically connected, such as by soldering to individual feed paths of the printed circuit on the board. This also physically securely attaches the spade connectors to the board so that in assembly they serve to physically mount the card 38 on the terminal block 36 with which the card is associated. For a sinking circuit, both of the plus or positive side of the coil driver outputs for the first two solenoid coils are connected to the common center spade connector 166 and the minus or negative side of the output for the first coil is electrically connected by the printed circuit to the spade connector 168 and the second coil is electrically connected by the printed circuit to the spade connector 164. For these two coils, the positive side of the direct current for energizing them is also supplied from one of the pins of the plug connector 160 to the center spade connector 166 through a portion of the printed circuit on the board. The outputs from the coil driver 142 for the third through the eighth solenoid coils are connected for the respective coils through the pins of a plug 174 mounted on the bottom of the circuit board 146 and connected to a complementary plug 176 of a wire harness 178 to the respective coils of the solenoids 42 and 44 of the second, third and fourth control valves 32 on the manifold through their associated terminal blocks 36. For sinking outputs, the positive side of the outputs for the two coils of the solenoids the second, third or fourth control valves 32 are connected by lead wires to the common center terminal strip 98 by its connector screw 110 and the negative side of the outputs for the same two coils 42 and 44 are connected by lead wires to the terminal clips 96 and 100 respectively by their screws 110.

The single microprocessor 140 can control many more solenoid coils (several hundred) than are usually actually required for any given manifold, and, indeed, more than are usually required for a single automated machine. Therefore, when a given manifold requires a coil driver for more than eight solenoids, additional coil drivers as needed are provided by auxiliary driver cards 40. The microprocessor 140 can communicate with one or more auxiliary driver cards 40 through the pins of a daisy chain connector plug 180 mounted on the bottom of the circuit board 146.

As shown in FIGS. 15–18, the auxiliary driver card 40 has another coil driver 142 and a voltage regulator 144 mounted on a circuit board 182 with an appropriate printed circuit thereon. This coil driver is connected in a daisy chain with the micro processor through a first plug 184 mounted on the circuit board 182 and receiving a compatible receptable plug 186 of a suitable wiring harness 188. For connecting in the daisy chain additional driver cards, a second plug 190 is mounted on the circuit board 182 and interconnected with the first plug 184 by appropriate portions of the printed circuit on the board. Electric power, preferably at 24 volts the DC is supplied to the voltage regulator 144 which powers the circuit on the board and the switching or changing of state of the coil driver 142 through two pins of a plug 160 mounted on the board and connected to the voltage regulator 144 through appropriate portions of the printed circuit. The outputs for the first two solenoid coils cycled by the coil driver 142 are electrically connected by a portion of the printed circuit to the spade terminals 198, 200 and 202, each of which has a shank 170 received in a hole 172 of the board 182 and connected to a portion of the printed circuit, such as by soldering. This also securely attaches the spade connectors to the circuit board so that in assembly they also serve to removably mount the auxiliary circuit card 40 on a terminal block. For a sinking circuit, the positive side of the outputs for both of the two coils 40 & 42 of the fifth control valve 32 are connected to the center spade terminal 200 and the minus or negative outputs for these solenoid coils are electrically connected to the spade terminals 198 and 202 respectively. The positive feed of the electric power for energizing these two solenoid coils is also supplied to the central terminal 200 from the power plug 160 through a suitable portion of the printed circuit. The outputs from the auxiliary coil driver 142 for an eleventh through a sixteenth solenoid are connected by a portion of the printed circuit to a solenoid output plug 174 mounted on the circuit board. Through a compatible receptable plug and a wire harness, these outputs can be connected to individual coils of additional control valves. If the valves on the manifold have more than 16 solenoids to be controlled, additional auxiliary driver cards 40 may be utilized as needed.

Figure 19:
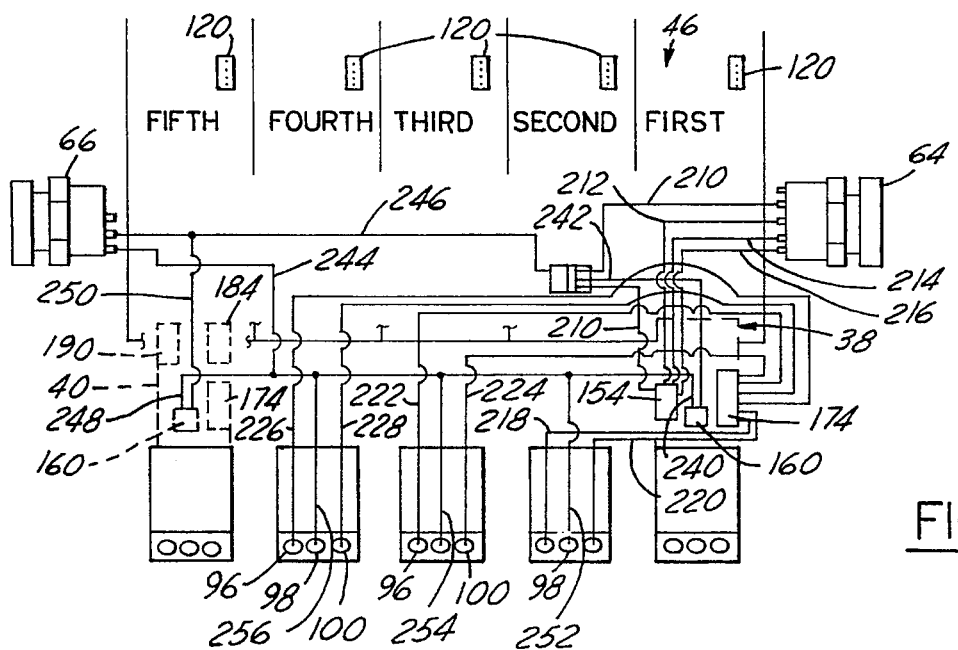
FIG. 19 is a schematic wiring diagram for the terminal blocks and circuit cards of the electronic control system.

FIG. 19 schematically illustrates the hard wiring of the solenoid and manifold assembly 30 between the communication connector 64, power connector 66, terminal blocks 36 and plugs for the communication card 38 and auxiliary card 40. For supplying power to the microprocessor 140, two pins of the communication connector 64 are connected by lead wires 210 and 212 and a complementary plug receptable to the two pins 156 and 158 of the plug 154 of the communication card 38. The microprocessor is also connected with the bus network of the controller or computer through lead wires 214 and 216 interconnecting two other pins of the communication connector 64 with the pins 150 and 152 of the plug 154 on the card 38 through the same plug receptable. The outputs of the coil driver of this card 38 for the coils of the first and second solenoids 42 and 44 of the first control valve 32 are electrically connected with the coils by the spade connectors 164, 166 and 168 being respectively secured to the terminal clips 96, 98 and 100 of the first terminal block by their associated screws 110. The outputs of this coil driver for the coils of the solenoids 42 and 44 of the second, third and fourth control valves 32 are electrically connected with their respective terminal blocks 36 by plugging a receptable 176 of the wire harness 178 into the solenoid switching plug 174 of the card 38. This wire harness contains the six lead wires 218,220; 222, 224 and 226,228. For a sinking circuit, the lead wires 218, 222 & 226 are connected to the terminal clip 96 by its screw 110 of the terminal block 36 of the respective second, third and fourth control valves and the lead wires 220, 224 and 228 are connected to the terminal clip 100 of the terminal block for these respective control valves.

Power for energizing the coils of the solenoids 42 and 44 of all of the control valves and for the voltage regulators 144 of the communication and auxiliary cards 38 & 40 is supplied to the assembly 30 through the connector 66. Power is supplied from the connector to the plug 160 of the communication card 38 through a complementary plug receptable and lead wires 240 and 242 which are respectively connected to the positive and negative or common lead wires or buses 244,246 which are each electrically connected to a seprate pin of the connector 66. The lead wire 246 also connects the common or ground side of this power supply with the common side of the power supplied from the communication port to the microprocessor through the lead wire 210. Power is supplied to the auxiliary coil driver board 40 through the lead wires 248, 250 which are connected through a complementary plug receptable with the plug 160 of the auxiliary board 40. The positive lead wires of both coils of the solenoids 42 and 44 of the first and last or fifth control valves 32 are also connected to the positive lead wires 248 and 240 through the plugs 160 and portions of the printed circuits for the auxiliary and communication card 40 and 38 as previously explained. The positive lead wires the coils of of both solenoid 42 & 44 of the remaining second, third and fourth control valves 32 are connected to the positive lead wire or bus 244 by drop wires 252, 254, 256 which are connected to the center terminal clip 98 by its associated screw 110 of their respective terminal blocks 36. Through operation of the coils drivers, the negative lead of each individual solenoid coil can be connected with the negative or common lead wire bus 246 to apply power to energize the solenoid coil under the control of the microprocessor 140.

Figure 20:
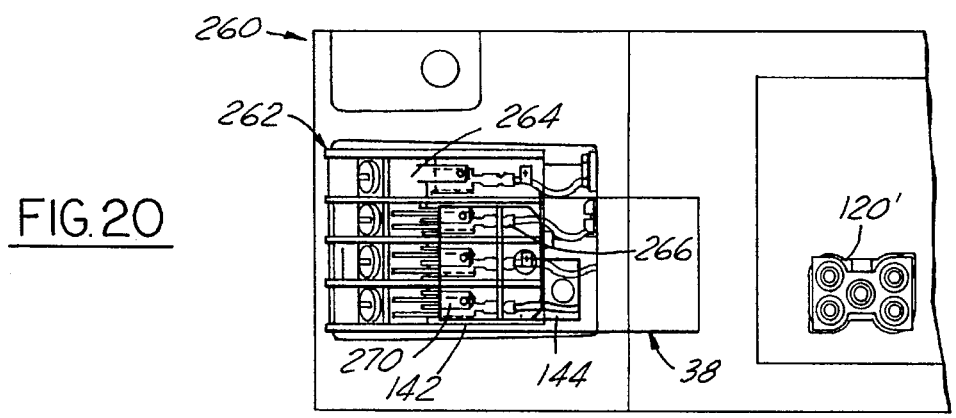
FIG. 20 is a top view of another manifold module showing the communication circuit card mounted on a four post terminal block of the module.
Figure 21:
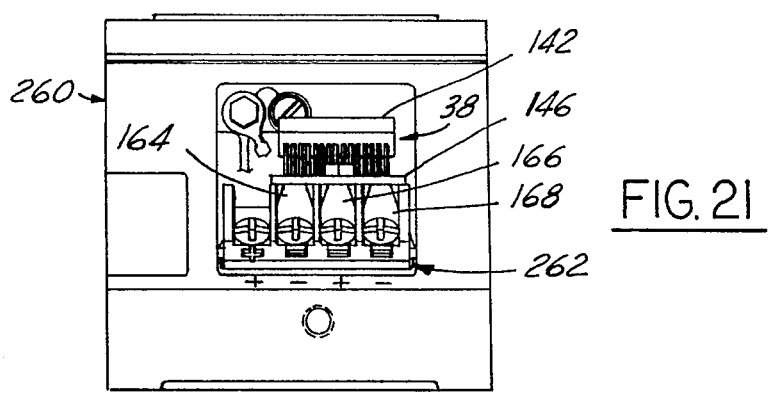
FIG. 21 is a front view of the manifold module of FIG. 20.

FIGS. 20 and 21 illustrate a modified manifold module 260 which is used with larger solenoid valves than the manifold module 46 and has a wider terminal block 260 with four terminal clips 262, 264, 266 & 268 each of which has the same construction and lateral spacing between them as do the terminal clips of the terminal blocks 36 of the manifold modules 46. With terminal blocks 260, the positive and negative lead wires of each of the coils of the two solenoids of a larger control valve (not shown) used with this module, is electrically connected to one of the terminal clips 264–270 respectively. Even though the terminal blocks have four separate terminal clip connectors, the same communication card 38 and auxiliary driver card 40 can be utilized with the larger manifold module 260. For example, as shown in FIGS. 20 and 21, for a sinking circuit, the communication card 38 can be mounted on and electrically connected to the three terminal strips 266, 268 and 270 of the terminal blocks 262. With this arrangement, a jumper wire is provided between the two positive terminals 264, 268 so that terminal 268 becomes common to both of the coils of the two solenoids of the control valve used with this module. With appropriate circuit changes, the same physical construction and arrangement of the cards 38 and 40 can also be used with sourceing circuitry. For example, with a sourceing circuit the communication card can be mounted on and secured and electrically connected to the three terminal connector strips 264, 266 and 268 of the terminal block. With this arrangement, a jumper wire connection is provided between the neative terminal clips 266 and 270 so that terminal 266 becomes common to both coils of the solenoid of the control valve used with this module.

Operation

Typically, the solenoid valve and manifold assembly 30 is used in an automated machine, equipment, production line or the like in which a programmable logic controller or a computer has been programmed to carry out the desired cycle and sequence of operation of the solenoid control valves of the automated equipment. The controller or computer communicates through a bus line or network with the microprocessor 140 of the communication card 38 which in response to commands or instructions from the controller or computer switches or changes the state of a specific address of the coil drivers 142 to energize or de-energize a designated solenoid coil of a designated valve 32 to change its position or operate the valve. To energize a solenoid coil of a valve in response to a specific command from the controller or computer, the microprocessor 140 controls the coil driver 142 to close: or complete the negative or common side of the power circuit for the selected coil to thereby supply electric power to the coil to energize it to control the valve. To de-energize this coil in response to another command from the controller or computer, the microprocessor 140 controls the coil driver 142 to change the state of this designated solenoid coil by opening the common or negative side of its power circuit to disconnect the power from the coil to thereby change the function of and control the valve. Under the control of the microprocessor 140, the first eight coils of the first four valves 32 of the assembly 30 are energized and de-energized by the coil driver of the communication card 38. The ninth and tenth coils of the fifth control valve 32 of the assembly 30 are energized, de-energized and controlled by the microprocessor through the coil driver 142 of the auxiliary card 40. This coil driver of the auxiliary card 40 is daisy chained to the micro processor and can also control as many as eight coils of solenoids of control valves.

One practical embodiment of a solenoid control valve and manifold assembly 30 of this invention uses a microprocessor 140 commercially available from Motorola Corporation under the Part No. XC68HC705X4CDW, coil drivers 142 for both the communication and auxiliary cards 38 & 40, which are commercially available from Texas Instrument Company under Part No. TP1C2802KV and voltage regulators 144 commercially available from National Semi-Conductor under Part No. LM78M05CT.

What is claimed is:

1. A control system comprising a manifold, at least one control valve actuated by at least one solenoid carried by the manifold, a terminal block received in the manifold for each control valve, said terminal block having at least three individual electric terminals thereon, at least two electric solenoids each having a coil and operably associated with a control valve carried by the manifold, a communication card having a circuit board, a microprocessor on the circuit board, a coil driver on the circuit board capable of controlling a plurality of solenoid coils of control valves, a printed circuit on the circuit board, the microprocessor controlling the coil driver, and at least three spaced apart electrical connectors each constructed and arranged to be releasably secured to a separate individual terminal of the same terminal block and each having a shank received in a hole through the circuit board and electrically connected to the printed circuit both to mount and support the circuit board on the terminal block and to provide outputs of the coil driver to the coils of two solenoids for controlling the application of electric power to each of the coils of said two solenoids.

2. The control system of claim 1 wherein the shank of each individual terminal is connected to a portion of the printed circuit by solder.

3. The control system of claim 1 which also comprises a plug carried by the circuit board and electrically connected with the microprocessor for providing a daisy chain connection of the microprocessor at least one auxiliary circuit board having a second coil driver capable of controlling a plurality of coils of solenoids of control valves.

4. The control system of claim 3 which also comprises a another plug carried by the circuit board and electrically connected with outputs of the coil driver for each of a plurality of coils of solenoids of control valves for controlling the application of electric power to such coils of the solenoids.

5. The control system of claim 1 which also comprises a plug carried by the circuit board and electrically connected with outputs of the coil driver for each of a plurality of coils of solenoids of control valves for controlling the application of electric power to such coils of the solenoids.

6. The control system of claim 1 wherein the microprocessor is constructed and arranged to be utilized in a bus network with a single address having serial communication to the microprocessor to control the outputs of the coil driver.

7. The control system of claim 6 which also comprises a communication plug carried by said circuit board and electrically connected with said microprocessor for a programmable controller or a digital computer to address the microprocessor to control the outputs of the coil driver for controlling the application of electric power to each of a plurality of coils of solenoids of the control valves.

8. The control system of claim 1 which also comprises a communication plug carried by said circuit board and electrically connected with said microprocessor for a programmable controller or a digital computer to address the microprocessor to control the outputs of the coil driver for controlling the application of electric power to each of a plurality of coils of solenoids of the control valves.

9. The control system of claim 1 which also comprises a recess in said manifold for each terminal block, each said recess opens to the exterior of the manifold, the terminal block for each control valve is slidably received in an associated recess in the manifold and is removable from its associated recess, and a removable cover for each recess which is releasably securable to the manifold to enclose the terminal block including any communication card received thereon within the manifold.

10. The control system of claim 9 which also comprises a detent carried by each terminal block for releasably retaining the terminal block in the manifold.

11. The control system of claim 10 which also comprises for each terminal block at least one guide rail and an associated follower, one of the guide rail and follower being carried by the manifold and the other of the guide and rail follower being carried by the terminal block, and the guide rail and follower cooperating to align and guide the terminal block during insertion of the terminal block into the recess in the manifold and removal of the terminal block from the recess.

12. The control system of claim 9 which also comprises for each terminal block at least one .guide rail and an associated follower, one of the guide rail and follower being carried by the manifold and the other of the guide rail and follower being carried by the terminal block, and the guide rail and follower cooperating to align and guide the terminal block during insertion of the terminal block into the recess in the manifold and removal of the terminal block from the recess.

13. The control system of claim 1 which also comprises a voltage regulator on the circuit board for supplying a regulated voltage to the coil driver for operation of the coil driver by the microprocessor.

14. The control system of claim 13 which also comprises a plug on the circuit board and electrically connected with the voltage regulator for supplying power to the voltage regulator.

15. The control system of claim 1 which also comprises an auxiliary driver card having a second circuit board, a second coil driver on said second circuit board and capable of controlling a plurality of coils of solenoids of control valves, a second printed circuit on said second circuit board, and at least three spaced apart second electrical connectors each constructed and arranged to be releasably secured to a separate individual terminal of a second terminal block and each having a shank received in a hole through the second circuit board and electrically connected to the second printed circuit both to mount and support the second circuit board on the second terminal block and to electrically connect outputs of the second coil driver to the coils of two solenoids for controlling the application of electric power to each of the coils of the two last mentioned solenoids, and the second coil driver being electrically connected in a daisy chain with the microprocessor for controlling the second coil driver by the microprocessor.

16. The control system of claim 15 wherein the shank of each second electrical connector is connected to a portion of the second printed circuit by solder.

17. The control system of claim 15 which also comprises a plug carried by the second circuit board and electrically connected with the microprocessor for providing a daisy chain connection of the microprocessor with the second coil driver for controlling the outputs of the second coil driver.

18. The control system of claim 17 which also comprises another plug carried by the second circuit board and electrically connected with outputs of the second coil driver for providing outputs of the second coil driver to control application of electric power to coils of solenoids of control valves.

19. The control system of claim 15 which also comprises a plug carried by the circuit board and electrically connected with outputs of the second coil driver for providing outputs for controlling the application of electric power to coils of solenoids of control valves.

20. The control system of claim 15 wherein the microprocessor is constructed and arranged to be utilized in a bus network with a single address having serial communication controlling both of the coil drivers.

21. A control system comprising a manifold, at least two control valves each actuated by at least one solenoid and carried by the manifold, a terminal block received in the manifold for each control valve, said terminal block having at least three individual electric terminals thereon, at least three electric solenoids each having a coil and operably associated with a control valve carried by the manifold, a communication card having a first circuit board, a microprocessor on the first circuit board, a coil driver on the first circuit board and capable of controlling a plurality of coils of solenoids of control valves, a first printed circuit on the first circuit board, the microprocessor controlling the first coil driver, and at least three spaced apart electrical connectors each constructed and arranged to be releasably secured to a separate individual terminal of the same terminal block and each having a shank received in a hole through the first circuit board and electrically connected to the first printed circuit both to mount and support the first circuit board on the terminal block and to provide outputs of the first coil driver to coils of the solenoids for controlling the application of electric power to the coils of the solenoids, an auxiliary driver card having a second circuit board, a second coil driver on said second circuit board and capable of controlling a plurality of coils of solenoids of control valves, a second printed circuit on said second circuit board, and at least three spaced apart second electrical connectors each constructed and arranged to be releasably secured to a separate individual terminal of a second terminal block and each having a shank received in a hole through the second circuit board and electrically connected to the second printed circuit both to mount and support the second circuit board on the second terminal block and to provide outputs of the second coil driver to coils of the solenoids for controlling the application of electric power to the last mentioned coils of the solenoids, and the second coil driver being electrically connected in a daisy chain with the microprocessor for controlling of the second coil driver by the microprocessor.

22. The control system of claim 21 which also comprises a plug carried by the first circuit board and electrically connected with the mircoprocessor and providing a daisy chain connection of the microprocessor with the second coil driver on the second circuit board for controlling the second coil driver outputs by the microprocessor.

23. The control system of claim 21 which also comprises a plug carried by the first circuit board and electrically connected with outputs of the first coil driver for each of a plurality of coils of solenoids for controlling the application of electric power to such coils of solenoids.

24. The control system of claim 21 wherein the microprocessor is constructed and arranged to be utilized in a bus network with a single address having serial communication to the microprocessor to control the outputs of both the first and second coil drivers.

25. The control system of claim 24 which also comprises a communication plug carried by said first circuit board and electrically connected with said microprocessor for communication with a programmable controller or a digital computer to address the microprocessor to control both the coil drivers for controlling the application of electric power to each of a plurality of coils of solenoids of control valves.

26. The control system of claim 21 which also comprises a communication plug carried by said first circuit board and electrically connected with said microprocessor for communication with a programmable controller or a digital computer to address the microprocessor to control both the coil drivers controlling the application of electric power to each of a plurality of coils of solenoids of control valves.

27. The control system of claim 21 which also comprises a recess in said manifold for each terminal block, each said recess opens to the exterior of the manifold, the terminal block for each control valve is slidably received in an associated recess in the manifold and is removable from its associated recess, and a removable cover for each recess which is releasably securable to the manifold to enclose the terminal block including any communication card received thereon within the manifold.

28. The control system of claim 21 which also comprises a voltage regulator on the first circuit board for supplying a regulated voltage to the first coil driver for operation of the first coil driver by the microprocessor.

29. For a control system having a manifold, at least one control valve with at least one solenoid and carried by the manifold, a terminal block received in the manifold for each control valve and having at least three individual electric terminals thereon, and at least two solenoids each having an electric coil and operably associated with a control valve carried by the manifold, a communication card comprising; a circuit board, a microprocessor on the circuit board, a coil driver on the circuit board and capable of controlling a plurality of coils of solenoids of control valves, the microprocessor controlling the coil driver, a printed circuit on the circuit board, and at least three spaced apart electrical connectors each constructed and arranged to be releasably secured to a separate individual terminal of the same terminal block and each having a shank received in a hole through the circuit board and electrically connected to the printed circuit both to mount and support the circuit board on the terminal block and to provide outputs of the coil driver to the coils of two solenoids for controlling the application of electric power to each of the coils of the two solenoids.

30. The control system of claim 29 wherein the shank of each individual terminal is connected to a portion of the printed circuit by solder.

31. The control system of claim 29 which also comprises a plug carried by the circuit board and electrically connected with the microprocessor for providing a daisy chain connection of the microprocessor with at least one auxiliary circuit board having a second coil driver capable of controlling a plurality of coils of solenoids of control valves.

32. The control system of claim 31 which also comprises another plug carried by the circuit board and electrically connected with outputs of the coil driver for each of a plurality of coils of solenoids of control valves for controlling the application of electric power to such coils of the solenoids.

33. The control system of claim 29 which also comprises a plug carried by the circuit board and electrically connected with outputs of the coil driver for each of a plurality of coils of solenoids of control valves for controlling the application of electric power to such coils of the solenoids.

34. The control system of claim 29 wherein the microprocessor is constructed and arranged to be utilized in a bus network with a single address having serial communication to the microprocessor to control the outputs of the coil driver.

35. The control system of claim 34 which also comprises a communication plug carried by said circuit board and electrically connected with said microprocessor for communication with a programmable controller or a digital computer to address the microprocessor to control the outputs of the coil driver for controlling the application of electric power to each of a plurality of coils of solenoids of control valves.

36. The control system of claim 29 which also comprises a communication plug carried by said circuit board and electrically connected with said microprocessor for communication with a programmable controller or a digital computer to address the microprocessor to control the outputs of the coil driver for controlling the application of electric power to each of a plurality of coils of solenoids of control valves.

37. The control system of claim 29 which also comprises a voltage regulator on the circuit board for supplying a regulated voltage to the coil driver for operation of the coil driver by the microprocessor.

38. For a control system having a manifold, at least two control valves each with at least one solenoid and carried by the manifold, a terminal block received in the manifold for each control valve and having at least three individual electric terminals thereon, and at least four solenoids each having an electric coil and being operably associated with a control valve carried by the manifold, an auxiliary coil driver card comprising, a circuit board, a coil driver on the circuit board and capable of controlling a plurality of solenoid coils of control valves, a printed circuit on the circuit board, and at least three spaced apart electrical connectors each constructed and arranged to be releasably secured to a separate individual terminal of the same terminal block and each having a shank received in a hole through the circuit board and electrically connected to the printed circuit both to mount and support the circuit board on the terminal block and to provide outputs of the coil driver to the coils of two solenoids for controlling the application of electric power to each of the coils of these two solenoids.

39. The control system of claim 38 wherein the shank of each individual terminal is connected to a portion of the printed circuit by solder.

40. The control system of claim 38 which also comprises a plug carried by the circuit board and electrically connected with the coil driver for providing a daisy chain connection of the coil driver with a microprocessor on another circuit board for controlling the outputs of the coil driver.

41. The control system of claim 40 which also comprises another plug carried by the circuit board and electrically connected with outputs of the coil driver for each of a plurality of coils of solenoids of control valves for controlling the application of electric power to such coils of the solenoids.

42. The control system of claim 38 which also comprises a plug carried by the circuit board and electrically connected with outputs of the coil driver for each of a plurality of coils of solenoids of control valves for controlling the application of electric power to such coils of the solenoids.

43. The control system of claim 40 which also comprises a voltage regulator on the circuit board for supplying a regulated voltage to the coil driver for operation of the coil driver by the microprocessor.

44. The control system of claim 38 which also comprises a plug on the circuit board and electrically connected with the voltage regulator for supplying power to the voltage regulator.

* * * * *